United States Patent Office 3,013,910

Patented Dec. 19, 1961

3,013,910

METHOD OF ALLOYING AN ALLOY MATERIAL WITH THE SURFACE OF A SEMICONDUCTOR BODY

Friedrich W. Dehmelt, Neu-Ulm (Danube), and Gerhard Grust, Ulm (Danube), Germany, assignors to Telefunken G.m.b.H., Berlin, Germany No Drawing. Filed May 2, 1958, Ser. No. 732,443
Claims priority, application Germany May 3, 1957
10 Claims. (Cl. 148—1.5)

This invention relates to a method of alloying an alloy material with the surface of a semi-conductor body wherein by suitable selection of the alloy components, solubility of the semi-conductor material within the alloy material is reduced. During the alloying process, it is desirable that the alloy components should wet the semi-conductor body thoroughly and penetrate said body homogeneously but to a very small depth and in an accurately controllable manner through solving of the semi-conductor material.

To meet such requirements, it has already been proposed, for example when alloying indium with germanium, to heat indium alone to the predetermined alloying temperature, to saturate it with germanium, to cool the composite product thus obtained and to shape it into pellets which are subsequently placed on the germanium body and alloy with the surface thereof by heating to the alloying temperature. As known, the alloying temperature used with every substance tested nowadays is always high, of the order of at least 500° C. or preferably higher when good and homogeneous wetting of the semi-conductor body by the alloy material is required. Alloying temperatures vary but little with the substance selected; however, wetting is considerably improved when temperature rises.

In the afore-described method, the desired purpose is only partly attained. When the saturated solution of semi-conductor and alloy materials cools down, the semi-conductor material having a higher melting point separates from the compound in the form of small crystals, until the remaining part has reached the eutectic point and the compound solidifies as an eutectic mixture (as far as such a mixture exists). In this method, the alloying pellet thus consists of the eutectic mixture in which semi-conductor crystals are embedded. If the alloying pellet placed on the semi-conductor body is heated to the alloying temperature, it takes up further semi-conductor material, both from the embedded crystals and from the semi-conductor surface, until it becomes saturated. This is precisely to be avoided. Moreover, crystals may not be entirely dissolved again and give rise to disturbance, e.g. in the manufacture of transistors, so that transistors become unserviceable. Relationships appear particularly plainly with indium and germanium; the alloying temperature to be used is of the order of 500° C., whereby indium dissolves 4.5% of germanium. The eutectic mixture has its melting point hardly below the melting point of pure indium, at about 150° C. and contains 0.5% of germanium only; it comprises therefore substantially pure indium which, on being heated to the alloying temperature, must take up 4% of germanium again, for the major part out of the germanium body.

An object of the invention is to provide an alloy material comprising various components which, according to the number thereof, form an eutectic or a peritectic mixture whose melting point is close to the alloying temperature.

Another object of the invention is to provide an alloy material comprising two alloy components which are mixed in eutectic proportion and fused together, said eutectic compound being subsequently placed on the semiconductor body and alloyed with the surface thereof at the alloying temperature.

A still further object of the invention is to provide an alloy material comprising three alloy components which are mixed in peritectic proportion and fused together, said peritectic compound being subsequently placed on the semi-conductor body and alloyed with the surface thereof at the alloying temperature.

According to the method of the invention, the desired purpose will always be attained, as opposed to prior art. Owing to the formation of an eutectic compound—in case of two alloy components—or a peritectic compound—in case of three alloy components—the semi-conductor material does not dissolve up to the eutectic or peritectic point, respectively. This is not the case in conventional methods, where the alloy material becomes saturated by the semi-conductor material at one temperature only, namely the alloying temperature, this resulting in the afore-mentioned disadvantages.

It will be appreciated that the method according to the invention is only advantageous when the eutectic or peritectic temperature lies below the alloying temperature, since at temperatures higher than the eutectic or peritectic temperature the semi-conductor material begins to dissolve in the alloy material. This can always be achieved by a suitable selection of the alloy components.

When selecting the alloy components, it should, however, be considered that, in the case of an eutectic gold-silicon mixture, the liquidus curve is very steep, at least in the vicinity of the alloying temperature. It results therefrom that, when heating above the eutectic or peritectic point, solubility of the semi-conductor material is increasing only very slowly. If all features indicated herewith are carefully taken into account, the method according to the invention leads to a very small and homogeneous dissolution of the semi-conductor material, such as not yet achieved in prior art, and to avoidance of any disturbance due to crystals embedded in the solidified alloying pellet.

In accordance with a preferred embodiment of the invention, the alloy components are so selected as to give rise to the required steep liquidus curves and eutectic or peritectic temperature just below the alloying temperature. The semi-conductor material itself may, though not compulsorily, be used as an alloy component. Any other alloy components meeting the requirements of eutectic or peritectic composition with steep liquidus curve and eutectic or peritectic temperature just below the alloying temperature can be used. The number of suitable alloy components which may be selected according to the present invention is thus much greater than in any prior art, especially when considering that more than three components could be used, should it turn out that there also exists a state equivalent to the eutectic or peritectic state for more than three alloy components. This has, however, not been established with accuracy up to now.

When selecting the alloy material, the small depth of penetration is obviously not the only point to be considered; it must also be remembered that the alloy material must have activator properties in accordance with the actual purpose of the alloying pellet. This condition is satisfied when one of the selected components has already the desired activator property. If this is not the case, a very small amount of a highly effective activator element must be added to the eutectic or peritectic compound. If the semi-conductor material is doped for N-type conduction, gallium (Ga), aluminium or boron (B) are suitable as activator additions; if the semi-conductor material is doped for P-type conduction, antimony (Sb) or arsenic (As) will be chosen as activator elements.

The following examples deal first with an eutectic compound of the alloy material wherein one component consists in the material of the semi-conductor body itself.

In carrying out the method of the invention, it has been found that the use of aluminium as one alloy component and silicon as the semi-conductor material and second alloy component gives satisfactory results. Aluminium acts as an activator when used with N-silicon. Its melting point lies at 650° C., that of silicon at 1414° C. and both substances form an eutectic compound of about 88% of aluminium and 12% of silicon, which melts at 577° C. At an alloying temperature of 650–700° C., the silicon body is already thoroughly wetted, but at the same time, there is very little silicon dissolved because silicon solubility is increasing very slowly with the temperature owing to its very high melting point. Since solubility increases so slowly, it is easy by selecting the alloying temperature to control the depth of penetration accurately, the requirement for good wetting defining only the lower limit of the alloying temperature range.

Beside aluminium, gold can also be used as an alloy component, in particular when germanium is used as the semiconductor material. Gold and germanium form an eutectic mixture which melts at about 356° C. The desired type of conduction is ensured preferably by adding to gold about 1% of a highly effective activator element (acceptor or donor, according to the case to be dealt with), such as gallium or aluminium, in a conventional manner.

In the following examples, the semi-conductor material is no longer used as an alloy component.

An eutectic compound having its melting point at 418° C. is formed by gold and tin, the latter amounting to 37.58% of the mixture. The eutectic compound of gold and lead (45% lead contents) has the same melting point, while a silver-cadmium compound (with 97% of cadmium) has its melting point at 337° C.

The aforementioned eutectic mixtures have no activator properties without a small addition of a highly effective activator element. On the other hand, an eutectic mixture of antimony and tellurium requires no such addition when used with a P-type semi-conductor material. The eutectic mixture of antimony and tellurium with 87–90% tellurium contents melts at 425° C.

Lead, cadmium and magnesium are suitable components for a peritectic composition. With the mixture ratio known in the literature as $U_1$ in three-component systems, a mixture of the three aforementioned alloy components melts a 435° C. A further peritectic compound $U_2$ having a melting point of 457° C. is formed by aluminium, magnesium and tin, these components being mixed in the known $U_2$ ratio. With N-type semi-conductor material, no activator element is to be added to said peritectic mixture, due to the presence of aluminium.

We claim:

1. A method of alloying a semi-conductor material with an alloying mixture of at least two materials excluding said semi-conductor material to form therewith an interface wherein the dissolving of the semi-conductor material in the alloying mixture is reduced to a minimum, said method comprising the steps of: mixing together said alloying materials in such proportions as to form an eutectic or peritectic composition which melts at a temperature that is very close to but still below the alloying temperature of said composition with said semi-conductor material, which alloying temperature is a temperature at which the surface of said semi-conductor material is wetted substantially homogeneously; by the eutectic or peritectic composition and fusing said alloying mixture and placing said mixture on said semi-conductor material and raising the temperature to said alloying temperature.

2. A method according to claim 1 wherein the alloy components of the alloy material are so selected that when heating the compound above its melting point, the solubility of the semi-conductor material in the alloy material increases at first very slowly.

3. A method according to claim 1, wherein a small amount of a highly effective activator is added to the alloy material when none of the components thereof has the desired activator properties.

4. A method according to claim 3, wherein the activator, in the case of an N-type semi-conductor material, is selected from the group consisting of gallium, aluminium, and boron, and, in the case of a P-type semi-conductor material, is selected from the group consisting of antimony, arsenic, and phosphorus.

5. A method according to claim 1, wherein the alloy material consists of gold and tin.

6. A method according to claim 1, wherein the alloy material consists of gold and lead.

7. A method according to claim 1, wherein the alloy material consists of silver and cadmium.

8. A method according to claim 1, wherein the alloy material consists of antimony and tellurium.

9. A method according to claim 1, wherein the alloy material consists of lead, cadmium and magnesium.

10. A method according to claim 1, wherein the alloy material consists of aluminium, tin and magnesium.

References Cited in the file of this patent

UNITED STATES PATENTS

| | | |
|---|---|---|
| 2,742,383 | Barnes et al. | Apr. 17, 1956 |
| 2,765,245 | English et al. | Oct. 2, 1956 |
| 2,781,481 | Armstrong | Feb. 12, 1957 |
| 2,836,522 | Mueller | May 27, 1958 |
| 2,847,336 | Pankove | Aug. 12, 1958 |

FOREIGN PATENTS

| | | |
|---|---|---|
| 537,909 | Canada | Mar. 5, 1957 |